Sept. 16, 1952     J. B. MAXWELL     2,610,472
PORTABLE REFRIGERATING APPARATUS
Filed Oct. 1, 1948     2 SHEETS—SHEET 1
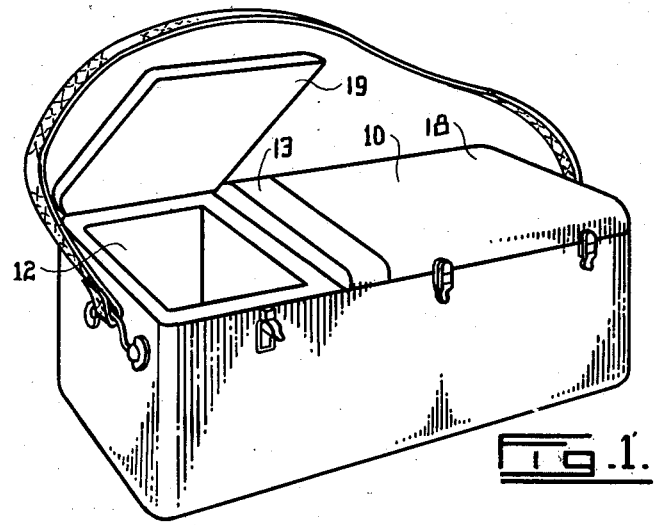
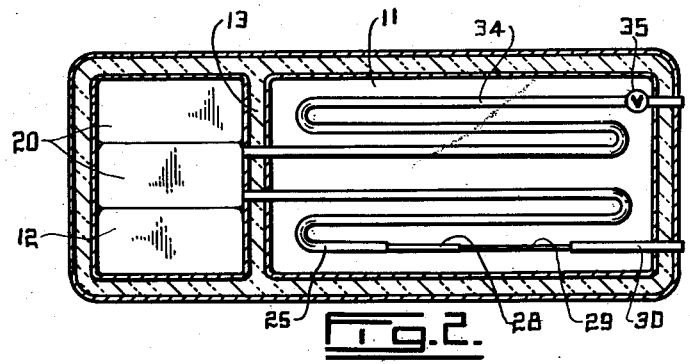
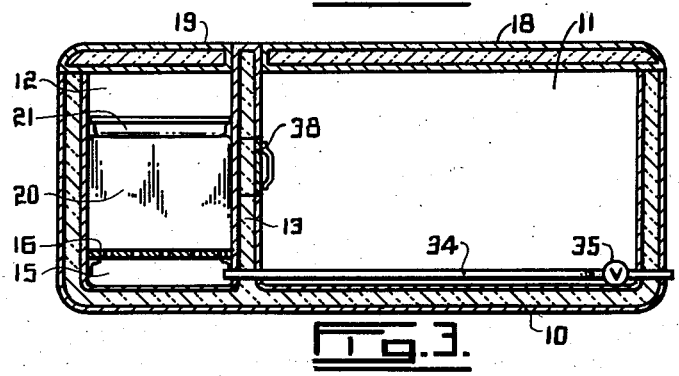
INVENTOR
JOHN BERTEL MAXWELL
BY
Fetherstonhaugh & Co.
ATTORNEYS

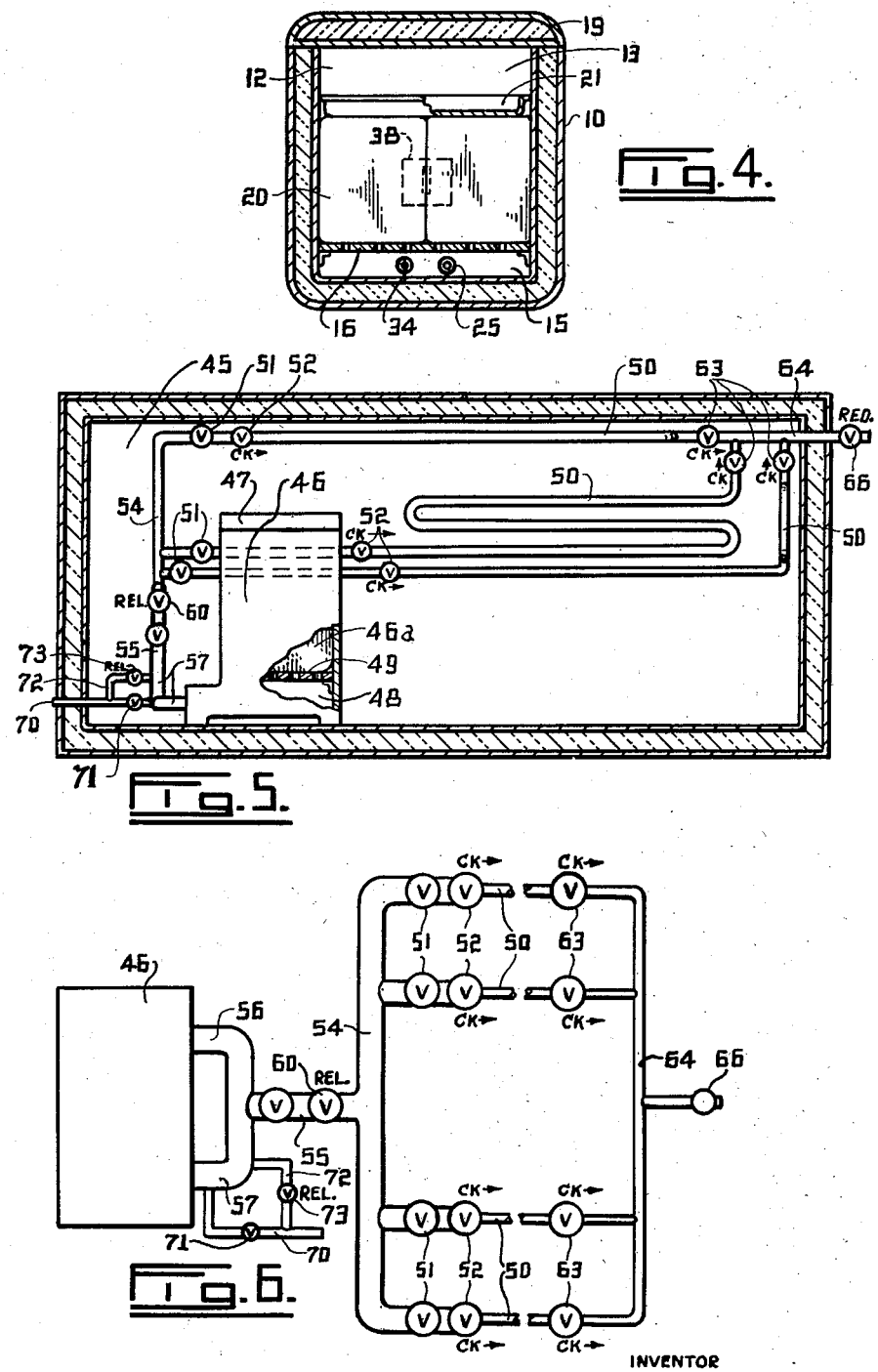

Patented Sept. 16, 1952

2,610,472

UNITED STATES PATENT OFFICE 2,610,472

PORTABLE REFRIGERATING APPARATUS

John Bertel Maxwell, Vancouver, British Columbia, Canada, assignor to Maxwell Refrigeration Limited, Vancouver, British Columbia, Canada Application October 1, 1948, Serial No. 52,239
In Canada June 13, 1946

2 Claims. (Cl. 62—2)

This invention relates to improvements in refrigerating apparatus.

This application is a continuation-in-part of the applicant's pending application Serial Number 779,003, filed October 10, 1947, now abandoned.

An object of the present invention is the provision of refrigerating apparatus in which solidified carbon dioxide or similar refrigerant may be used to keep commodities for relatively long periods.

Another object is the provision of refrigerating apparatus in which carbon dioxide or similar refrigerant may be used to maintain a temperature much lower than is possible with ordinary ice.

Another object is the provision of non-mechanical refrigerating apparatus in which the temperature may be controlled.

A further object is the provision of portable refrigerating apparatus which is very simple in construction, and which, when charged with solidified carbon dioxide or similar refrigerant will continue to function for a comparatively long time.

Still another object is the provision of refrigerating apparatus in which solidified carbon dioxide may be used to keep products cool without freezing them solid.

With the above and other objects in view, the present invention consists essentially of refrigerating apparatus comprising a storage compartment, a chest for receiving carbon dioxide or similar refrigerant, a coil in the compartment communicating at its inner end with the chest, and a pressure maintaining valve in the coil adjacent the outer end thereof, said valve being adapted to discharge into the atmosphere outside the compartment, as more fully described in the following specification and illustrated by way of example in the accompanying drawings, in which:

Figure 1 is a perspective view of a simple form of refrigerating apparatus,

Figure 2 is a horizontal longitudinal section through the apparatus shown in Figure 1, Figure 3 is a vertical longitudinal section through Figure 1, Figure 4 is a vertical cross section through the apparatus adjacent one end thereof, Figure 5 is a vertical longitudinal section through an alternative form of the apparatus, and Figure 6 is a diagrammatic view of the system shown in Figure 5.

Referring more particularly to Figures 1 to 4 of the drawings, the refrigerating apparatus is in the form of a container 10 which is divided into a storage compartment 11 and a chest 12. All the walls of the container are insulated, as shown, and an insulated wall 13 separates the chest 12 from the compartment 11. A gas chamber 15 is provided at the bottom of the chest in any convenient manner. This may be done by means of a perforated grill 16 which is spaced above the bottom of the gas chamber. Actually, this grill divides the chest into two sections. An insulated cover 18, see Figure 1, is provided for the compartment 11, and an insulated cover 19 is provided for the chest. This chest is adapted to receive blocks 20 of solidifid carbon dioxide or similar refrigerant. These blocks rest on the grill 16. If desired, a floating cover 21 may be provided in the chest. This cover slidably fits in the chest and rests upon the top of the blocks 20 so that the area in which these blocks are located gradually decreases as the blocks diminish in size. A refrigerating coil 25 is mounted in the compartment 11, communicating at its inner end with the chest and at its outer end with the atmosphere outside the compartment. This coil winds back and forth along a wall of the compartment. The inner end of this coil may communicate with the chest in any convenient manner, but it is preferable to have the gas chamber 15 and this inner end communicate with the chest through said chamber. Thus, the coil preferably communicates with the bottom of the refrigerant chest.

A pressure maintaining valve si located in the coil adjacent the outer end thereof, and said valve is adapted to discharge into the atmosphere outside the compartment. One form of pressure maintaining valve is illustrated in Figure 2, and consists of one or more sections of pipe of reduced diameter, this figure showing sections 28 and 29. The diameter of the section 28 is less than that of the coil 25, while the diameter of the section 29 is less than that of the section 28. When a plurality of pipe sections are used in this type of valve, the diameters of the sections progressively become less towards the atmosphere outside the compartment. In the illustrated setup, the section 29 may discharge directly out of the compartment, or as shown, it may discharge into a section of pipe 30, which is of the same diameter as the coil 25, said section 30 discharging out of the compartment.

It is preferred, although not absolutely necessary, to have another coil 34 in the storage compartment. The inner end of this coil communicates with the refrigerant chest in the same manner as the inner end of the coil 25. Thus, in this form of the invention, the inner end of the coil communicates with the gas chamber 15. The outer end of the coil communicates with the atmosphere outside the compartment 11, and a control valve 35 is located in this coil adjacent its outer end. This valve may be inside or outside the compartment, and is preferably in form of a manual shut-off valve.

Normally, the valve 35 is closed. The blocks 20 of the refrigerant are continuously giving off a gas at a very low temperature. This gas is collected in the chamber 15, and as its pressure builds up, it flows through the coil 25. The pressure maintaining valve in this coil keeps the pressure therein at a predetermined point. As the diameters of the pipe sections 28 and 29 are progressively smaller than that of the coil, the flow of gas is restricted at this point. In other words, the gas from the refrigerant blocks accumulates faster than it is able to pass through the sections 28 and 29 of the pressure maintaining valve. This keeps the gas in the coil 25 within the compartment for a predetermined time in order that it will absorb the maximum amount of heat from said compartment. This controlling of the flow of gas prevents the temperature in the compartment from going too low and it prevents the refrigerant blocks from disappearing too rapidly. At the same time, by maintaining a continuous flow of the gas, it is prevented from reaching a pressure which would in itself create heat and thus reduce its heat-absorbing capabilities.

The main purpose of the coil 34 is to give a better control of the temperature in the compartment 11. For example, when the container is first charged with a refrigerant, it may be desirable quickly to lower the temperature in the storage department to a desired point. This may be done by opening the valve 35 to permit a flow of gas through the coil 34. Once the desired temperature is reached, the valve may be closed. The coil 25 may now be able to keep the compartment at this point. However, if it is desired to lower the temperature in the compartment below that normally maintained by the coil 25, the valve 35 may be opened to accomplish this. The lower temperature may be maintained by leaving the valve slightly open, in which case it acts as a pressure maintaining valve in the same manner as the one in the coil 25.

With this arrangement, the commodities to be cooled may be kept in the compartment 11 without danger of freezing. If it is desired quickly to freeze some article, it may be placed on the floating cover 21 in the chest 12. The article will be kept in a frozen state as long as it remains in the chest and as long as there is any solid refrigerant therein. If desired, a section 38 of the insulation of the partition 13 may be removable. If this insulation section is removed, the temperature in the compartment 11 will drop sharply and will remain below freezing point until the insulation section is returned to its position in the partition.

As will be seen from the above, this apparatus is designed to make the utmost use of the gases given off by the refrigerant blocks. This is helped by providing the floating cover 21 so that the effective area of the chest in which the blocks are located remains just large enough to accommodate the blocks. Thus, the gas cannot accumulate in the chest, but must move down into the gas chamber 15, and thence through one or both of the coils in the storage compartment.

Figures 5 and 6 show an alternative of this invention which is preferred for relatively large storage areas. It may be used either in cold storage buildings, or in railroad refrigerator cars. In this alternative, 45 is a relatively large storage compartment in which is mounted a refrigerant chest 46 having a removable cover 47. The walls of this chest may or may not be insulated. It is preferable to provide a gas chamber 48 at the bottom of the chest, said chamber being separated therefrom by a perforated grill 49. The chest is adapted to receive blocks 46a of solid carbon dioxide or similar refrigerant.

A plurality of coils 50 are mounted on the walls, ceiling, and/or the floor of the compartment 45. The inner ends of these coils communicate with the chamber 48 and chest 46 in any convenient manner. Each coil is provided adjacent its inner end with a shut-off valve 51, and with a non-return check valve 52. A header pipe 54 connects the inner ends of the coils to a pipe 55 which, in turn, is connected to one or more outlet pipes, such as pipes 56 and 57, which extend to the gas chamber. A pressure control valve 60 is located in the pipe 55. This valve is designed to open when the pressure in the chest and gas chamber reaches a predetermined point and it closes when this pressure drops below said point. It has been found that the best results are obtained when this valve is set to open when the gas pressure in the chest reaches somewhere from 14 to 18 pounds.

Each coil 50 preferably has a non-return check valve 63 adjacent its outer end, and these outer ends are connected to a common discharge pipe 64, which communicates with the atmosphere outside the compartment 45. A blow-down valve 66 is located in this discharge pipe between the coils and the atmosphere. This valve is designed to open when the pressure in the coils reaches a certain point, and to close again when the pressure drops to another predetermined point. It has been found desirable to have this valve open when the pressure reaches somewhere from 8 to 10 pounds, and to have it closed again when the pressure drops to approximately half the opening pressure, that is, in this example, at 4 or 5 pounds.

If desired, a drain pipe 70 having control cock 71 may be provided for removing any moisture which may accumulate in the system. This drain pipe may extend from the pipe 57 outside the compartment. It is also preferable to provide a by-pass pipe 72 from the pipe 57 around the valve 71 to the pipe 70, said pipe 72 having a safety valve 73 therein which is adapted to open in the event of the pressure in the system rising to a dangerous point.

When the chest 46 is charged with carbon dioxide blocks, the gas given off accumulates in the chest and gas chamber until it reaches the desired pressure, say for example, 14 pounds, at which time the pressure control valve 60 opens.

As soon as the pressure in the coils 50 reaches the predetermined point, say for example, 8 pounds, the blow-down valve 66 opens and it remains open until the coil pressure drops to 4 pounds. In this way, the coils are filled with a heat absorbing gas, and by the time the pressure reaches 8 pounds it has done its work. Then some of the gas is removed and fresh gas is added.

It has been found that the best results are obtained when the pressure in the chest is kept around 14 pounds. This seems to be about the right pressure for obtaining the maximum results from the refrigerant. Experiments have proven that considerably higher pressures tend to reduce the efficiency of the gas as a refrigerant. With this arrangement, it usually takes some time to build up the required pressure in the coils after the pressure therein has been reduced to the minimum point by the blow-down valve. This keeps the gas in the coils long enough to absorb a maximum amount of heat. If the gas moves too rapidly through the coils, it is wasted. On the other hand, if it is kept too long or if the pressure is too high, its efficiency is considerably decreased.

The number of coils in the compartment 45 depends upon the minimum temperature which is desired to obtain in this compartment. One coil only may be used if the minimum temperature is not too low. However, for relatively low points it is desirable to use two or more coils rather than one comparatively long coil. It seems that if the coil is too long the gas is subjected to too much friction therein and its efficiency is greatly reduced. An advantage of the multiple coils is that the compartment 45 may be used to store commodities at different temperatures. For instance, if a very low temperature is desired, all four coils may be used. If, on the other hand, the required temperature is not very low, the valves 51 of one or more coils may be closed to cut off their respective coils from the chest. The remaining coil or coils will then keep the temperature at the desired point. The check valves 63 will prevent any of the gas getting back into the shut off coils from the common discharge pipe 64. This coil arrangement is particularly valuable when the apparatus is used in refrigerator cars. The car may be used to transport a product, such as fish, in a frozen state, and on the return trip it may be used to carry another product, such as fruit, which should be just chilled and not frozen.

It is obvious that both forms of this invention may be used for air conditioning purposes. The "storage compartment" may be a room or area in which the temperature is to be maintained at a desired point. The cooling coils may be located in the room or in the walls thereof. Furthermore, air may be cooled in the "storage compartment" and then blown into the room or area. This apparatus is particularly useful in air-conditioning railway coaches and sleepers. In view of the above, the terms "storage compartment" or "compartment" as used in this specification and the accompanying claims, is intended to include rooms, areas, auditoriums, and the like.

What I claim as my invention is:

1. Refrigerating apparatus comprising a storage compartment, a chest for receiving solid carbon dioxide or similar refrigerant, a gas chamber communicating with the bottom of the chest, at least two outlet pipes from the gas chamber, a common pipe from said outlet pipes, a pressure control valve in the common pipe, said valve opening when the pressure in the chest reaches a predetermined point and closing when it drops below said point, a plurality of individual coils in the compartment communicating at their inner ends with the outlet pipe on the side of the control valve remote from the chest, a valve in each coil adjacent the inner end thereof by means of which its coil may be shut off from the chest, a common discharge pipe connected to the coils and communicating with the atmosphere outside the compartment, and a blow-down valve in the discharge pipe, said valve being adapted to open when the pressure in the coils reaches a predetermined point and to close again after the pressure has dropped to another predetermined point.

2. Refrigerating apparatus comprising a storage compartment, a chest for receiving solid carbon dioxide or similar refrigerant, a coil in the compartment communicating at its inner end with the chest and at its outer end with the atmosphere outside the compartment, a pressure control valve in the coil adjacent its inner end, said valve opening when the pressure in the chest reaches approximately 14 to 18 pounds and closing when it drops below said point, and a blow-down valve in the coil adjacent its outer end, said blow-down valve being adapted to open when the pressure in the coil reaches approximately from 8 to 10 pounds and to close again after the pressure has dropped to approximately 4 or 5 pounds.

JOHN BERTEL MAXWELL.

REFERENCES CITED

The following references are of record in the file of this patent:

UNITED STATES PATENTS

| Number | Name | Date |
| --- | --- | --- |
| 1,878,042 | Wagner | Sept. 20, 1932 |
| 1,888,646 | Weston | Nov. 22, 1932 |
| 1,893,483 | Belt | Jan. 10, 1933 |
| 1,949,518 | Vold | Mar. 6, 1934 |
| 1,951,074 | Warren | Mar. 13, 1934 |
| 1,951,679 | Sherrick | Mar. 20, 1934 |
| 2,039,334 | Nagy | May 5, 1936 |
| 2,056,731 | Lithgow | Oct. 6, 1936 |
| 2,089,965 | Justheim | Aug. 17, 1947 |

FOREIGN PATENTS

| Number | Country | Date |
| --- | --- | --- |
| 522,507 | Great Britain | June 19, 1940 |